(12) United States Patent
Powell et al.

(10) Patent No.: US 8,384,694 B2
(45) Date of Patent: Feb. 26, 2013

(54) INFRARED VISION WITH LIQUID CRYSTAL DISPLAY DEVICE

(75) Inventors: Karlton Powell, Lake Stevens, WA (US); Zhiqiang Liu, Kirkland, WA (US); Prafulla Masalkar, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 768 days.

(21) Appl. No.: 12/620,483

(22) Filed: Nov. 17, 2009

(65) Prior Publication Data
US 2011/0115747 A1 May 19, 2011

(51) Int. Cl.
*G06F 3/042* (2006.01)
(52) U.S. Cl. ....................................... 345/175
(58) Field of Classification Search .................. None
See application file for complete search history.

(56) References Cited

U.S. PATENT DOCUMENTS

| | | | |
|---|---|---|---|
| 7,232,986 B2 * | 6/2007 | Worthington et al. | 250/221 |
| 7,506,987 B2 | 3/2009 | Nilsen | |
| 7,516,571 B2 | 4/2009 | Scrogin et al. | |
| 7,548,677 B2 * | 6/2009 | Bathiche et al. | 385/129 |
| 2003/0058517 A1 | 3/2003 | Lindquist et al. | |
| 2003/0122771 A1 * | 7/2003 | Sumiyoshi et al. | 345/102 |
| 2008/0121442 A1 | 5/2008 | Boer et al. | |
| 2008/0252800 A1 | 10/2008 | Tan et al. | |
| 2008/0259247 A1 | 10/2008 | Stuart et al. | |
| 2008/0284925 A1 | 11/2008 | Han | |
| 2009/0027358 A1 * | 1/2009 | Hosono | 345/175 |
| 2009/0121135 A1 | 5/2009 | Warner et al. | |
| 2009/0128508 A1 | 5/2009 | Sohn et al. | |
| 2009/0231497 A1 | 9/2009 | Takahashi et al. | |

OTHER PUBLICATIONS

"International Search Report", Mailed Date: Aug. 30, 2011, Application No. PCT/US2010/055175, Filed Date: Nov. 2, 2010, pp. 9. (MS# 327853.02).
Takahashi, et al., "Optical System and Characteristics of an LCD Projector with Interleaved Pixels Using Four LCD Projectors", Retrieved at <<http://ieeexplore.ieee.org/stamp/stamp.jsp?arnumber=00350777>> In the proceedings of IEEE Transactions on Circuits and Systems for Video Technology, Feb. 1995, vol. 5, No. 1, pp. 41-47.
"RoadieX10", Retrieved at <<http://www.christie.jp/news/pdf/040716RoadieX10lr__Jul03.pdf>> Jul. 2003, pp. 2.
Leitner, et al., "FLUX: A Tilting Multi-Touch and Pen Based Surface", Retrieved at <<http://delivery.acm.org/10.1145/1530000/1520459/p3211-leitner.pdf?key1=1520459&key2=0341899421&coll=GUIDE&dl=GUIDE&CFID=48257051&CFTOKEN=10237642>> In the proceedings of the 27th international conference extended abstracts on Human factors in computing systems, Apr. 4-9, 2009, pp. 3211-3216.

* cited by examiner

*Primary Examiner* — Christopher R Lamb
(74) *Attorney, Agent, or Firm* — Alleman Hall McCoy Russell & Tuttle LLP (57) ABSTRACT

Various embodiments related to infrared vision for a liquid crystal display (LCD) device are disclosed herein. For example, one disclosed embodiment provides a display system, comprising an LCD device and a display backlight configured to illuminate the LCD device by directing visible light toward an interior surface of the LCD device. The display system further comprises a wavelength-selective reflector disposed between the display backlight and the LCD device and having a smooth surface facing the interior surface of the LCD device, where the wavelength-selective reflector has a wavelength-selective coating configured to cause incident visible light from the display backlight to be transmitted through the wavelength-selective reflector to the LCD device, and cause incident infrared light reflected from an object on or near an exterior surface of the LCD device to be reflected off of the wavelength-selective reflector and directed to an infrared vision subsystem.

20 Claims, 4 Drawing Sheets

INFRARED VISION WITH LIQUID CRYSTAL DISPLAY DEVICE

BACKGROUND

Display devices may utilize various technologies for displaying images, such as cathode ray tube (CRT) technologies, projection-based technologies, liquid crystal display (LCD)-based technologies, etc. Some display devices may also be configured to detect touches of physical objects on a surface of the display, using technologies such as capacitive detection, resistive detection, optical detection, etc. In some cases, optical detection technologies may be further configured to detect "near-touches" of physical objects located near a surface of the display.

A computing system which combines the functionality of a display device and optical detection such as an infrared vision subsystem may have one or more features compromised as a result of integrating the two technologies. As an example, such a display system may combine a projection-based display system with a standard infrared vision subsystem, however, use of the projection-based display may significantly increase the cost of such a system. Use of an LCD display may be more cost-effective, however the standard configurations employed to provide infrared vision can interfere with the LCD backlight. As a result, the overall form factor may need to be altered to avoid such interference, and/or it may be necessary to employ various optics to minimize the effects on the LCD display. Such optics can have constraints (e.g., focal length, optical path length, depth of field, depth of focus, etc.) which dictate a larger form factor for the display. Further, such optics may increase distortion, aberration, etc. of the obtained image, and may not be suitable for high-quality imaging applications.

SUMMARY

Various embodiments related to infrared vision for an LCD device are disclosed herein. For example, one disclosed embodiment provides a display system, comprising a liquid crystal display device and a display backlight configured to illuminate the liquid crystal display device by directing visible light toward an interior surface of the liquid crystal display device. The display system further comprises a wavelength-selective reflector disposed between the display backlight and the liquid crystal display device and having a smooth surface facing the interior surface of the liquid crystal display device, where the wavelength-selective reflector has a wavelength-selective coating configured to cause incident visible light from the display backlight to be transmitted through the wavelength-selective reflector to the liquid crystal display device, and cause incident infrared light reflected from an object on or near an exterior surface of the liquid crystal display device to be reflected off of the wavelength-selective reflector and directed to an infrared vision subsystem This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A display system may utilize LCD-based technologies for visually displaying content such as text, images, photos, movies and the like. As described above, certain design challenges can arise when combining an LCD-based display system with a vision subsystem that is used for optical touch detection or to otherwise optically detect objects on or near the LCD device. The present disclosure provides for a display system employing an LCD device and a smooth wavelength-selective reflector positioned between the LCD device and a display backlight. The wavelength-selective reflector and various other components are arranged to enable an infrared vision subsystem to "see" (detect), or image, objects on or near the outside of the LCD panel without interfering with the illumination of the LCD by the display backlight. Various embodiments of such a system are described in more detail as follows.

Figure 1:
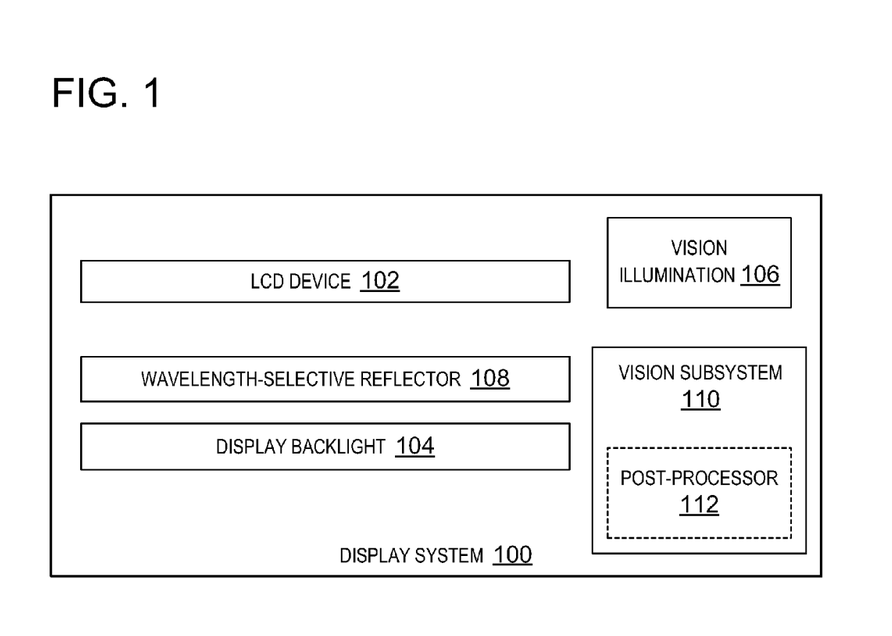
FIG. 1 shows a block diagram of an embodiment of an example display system.

FIG. 1 shows a block diagram of an embodiment of an example display system 100. Such a display system may be utilized, for example, in an interactive computing device having a large-format horizontally oriented display (e.g., a table-type form factor). Other non-limiting examples include tablet computers, wall displays, teleconferencing displays, etc. Display system 100 includes an LCD device 102 configured to visually display images to a user viewing and, in the case of an interactive display, interacting with, an exterior surface of the LCD device. In interactive systems, the exterior surface of the LCD device may be configured to enable interaction via touch inputs and/or gesture inputs, and/or via other optically-detected input based on an object being placed on or near the exterior surface of the LCD device. It can be appreciated that such a surface may further include additional layers traditionally used with LCD devices such as substrates, films, coatings, diffusers, glass, etc. without departing from the scope of this disclosure.

Additionally, LCD device 102 has an interior surface, namely the surface opposite to the external surface. In general, as used herein, the exterior surface of the LCD device refers to the side that the user views and interacts with, while the interior surface refers to the side that is illuminated by the backlight in order to provide viewable images that can be seen by a user from the exterior of the device. As such, a display backlight 104 positioned beneath LCD device 102 illuminates LCD device 102 by directing visible light toward the interior surface of LCD device 102. An example of such a configuration is described in more detail with reference to FIG. 2. In some implementations, use of an LCD device in display system 100 may allow for reduced production costs in comparison to a display system having a projection-based display device.

Display system 100 may further include an infrared illumination source 106 and supporting components configured to direct infrared light toward an object on or near the exterior surface of LCD device 102. Infrared light reflected off the object may then be captured by an infrared vision subsystem in order to acquire an image of the object or to otherwise receive an input for processing. Prior systems commonly require that portions of the vision subsystem be positioned between display backlight 104 and LCD device 102. Such an arrangement, however, can result in a situation where the vision subsystem compromises display functionality. In particular, vision subsystem components may block visible light directed to LCD device 102 from display backlight 104. Therefore, display system 100 includes a wavelength-selective reflector 108 disposed between display backlight 104 and LCD device 102 to direct incident infrared light (e.g., reflected from an object on or near the exterior surface of the LCD device) to an infrared vision subsystem 110. Wavelength-selective reflector 108 has a smooth surface facing the interior surface of LCD device 102 and a wavelength-selective coating configured to cause incident visible light from display backlight 104 to be transmitted through wavelength-selective reflector 108 to LCD device 102. As such, wavelength-selective reflector 108 does not reduce the amount of backlight incident at LCD device 102. This allows display system 100 to provide an infrared vision subsystem 110 that efficiently coexists with LCD device 102 while minimizing compromises to display functionality.

Additionally, the wavelength-selective coating is further configured to cause incident infrared light reflected from an object on or near the exterior surface of LCD device 102 to be reflected off the wavelength-selective reflector 108 and directed to infrared vision subsystem 110. As an example, wavelength-selective reflector 108 may include a dichroic mirror configured to optically transmit visible light and reflect infrared light.

Infrared vision subsystem 110 may be disposed so that its components are situated outside of all straight-line optical paths occurring between corresponding operative portions of display backlight 104 and LCD device 102, since the wavelength-selective reflector 108 exhibits limited effects on visible transmitted light. In certain implementations, such an arrangement can provide the previously-discussed benefit of minimizing interference with the illumination of LCD device 102 by the display backlight. Examples of suitable infrared vision subsystems include, but are not limited to offset imaging systems, tilted plane imaging systems and folded telecentric systems.

A possible use scenario for display system 100 includes detecting an object placed on or near the exterior surface of LCD device 102. Upon illuminating the object with infrared light via infrared illumination source 106, the infrared light incident on the object is then reflected from the object, and directed back through display system 100 toward wavelength-selective reflector 108. Upon receiving incident infrared light reflected from the object, wavelength-selective reflector 108 reflects the infrared light and directs it to infrared vision subsystem 110. As such, infrared vision subsystem 110 acquires an image of the object or otherwise optically receives an input, for example, by directing the received incident infrared light to an image sensor. Such a vision subsystem may utilize offset imaging, tilted plane imaging, and/or folded optics, as described in more detail hereafter.

In this use scenario, the optical path for the display light, as opposed to the vision light, is from display backlight 104, through wavelength-selective reflector 108, through LCD device 102 and toward a viewer's eye. The path for the vision light (i.e., the infrared light) is from infrared illumination source 106 to an object on or near the external surface of LCD device 102, or, for the alternate embodiment of an infrared backlight guide, such a path may include passing infrared light through LCD device 102 to the object. The infrared light reflected off of the object then travels back through LCD device 102 and is then reflected off wavelength-selective reflector 108, and directed through vision optics of infrared vision subsystem 110. In some embodiments, infrared vision subsystem 110 may further include a post-processor 112, which may include software and/or hardware, for post-processing the image acquired via the image sensor for distortion correction, stitching, and other processing as needed. In some embodiments, post-processor 112 may be coupled to the infrared vision subsystem (e.g., an infrared vision subsystem including a tilted plane imaging system).

Depending on how they are implemented, embodiments of display system 100 may overcome various limitations associated with prior systems that incorporate vision functionality. For example, the wavelength-selective reflector and associated vision subsystems in the present disclosure may avoid or reduce issues associated with optical wedge lightguides (i.e., "through-wedge" infrared vision systems). Such through-wedge systems are often limited due to degradation from material inhomogeneity and dispersion, gratings and/or prismatic turning films, dichroic-coated gratings and/or prismatic turning films, diffraction effects, and additional diffraction due to use of a Fresnel reflector, in addition to the difficulties encountered when manufacturing the optical wedge, such as surface roughness and surface ripple. Embodiments of the present system can not only image objects on and/or near the surface, but also have the capability of detailed high-resolution imaging, such as taking a picture of an electronic device on or near the surface of the LCD. Further, by replacing the diffuser disposed on or just under the LCD panel with a switchable diffuser, such as a polymer dispersed liquid crystal (PDLC) diffuser, imaging objects and gestures substantially beyond the surface may be realized when imaging during a non-diffuse state. In addition to providing higher-resolution on the vision side, the disclosed examples of vision functionality may in some cases be realized at lower cost than systems employing an optical wedge.

With regard to LCD device 102, any suitably-configured LCD panel may be utilized. For example, in some embodiments, LCD device 102 may provide a polarized display. As an example, an achromatic retarding layer may be laminated onto LCD device 102. As another example, a diffuser placed immediately after LCD device 102 may be used to help randomize polarization, and may provide an additional benefit if used with an achromatic retarding layer before the diffuser layer, such as compatibility with polarized sunglasses.

With regard to display backlight 104, it may be challenging to maintain uniform illumination of the LCD device, particularly near the edges of the display. Such nonuniformity may be due to the z-separation distance (i.e., separation distance along a z-axis perpendicular to the LCD device). Accordingly, various backlight configurations may be employed to increase uniformity of illumination. In some embodiments the backlight may be enlarged and extended, to enable fill-in of roll-off near a display edge. In some embodiments, a reflective sidewall can be extended at the edge of the backlight to the display panel to reflect and redirect wasted light back into display panel, to prevent roll-off and maintain uniformity. Such an extension can be an extension of the backlight reflective material, with appropriate cut-outs for vision subsystem optics. As another example, the reflective sidewall may have appropriate cut-outs to accommodate vision subsystem optics. As yet another example, a dichroic mirrored side wall may be configured to transmit infrared light and to reflect visible light, however, this may add additional cost to the system. As yet another example, a diffuser may be laminated onto the LCD panel to significantly reduce the roll-off effect, either on the exterior side or interior side of the display panel.

With regard to infrared illumination source 106, any suitable infrared illumination system may be utilized. Such a suitable system may provide frontlight illumination, backlight illumination, or any combination thereof. As an example, a laminated diffuser having two opposed infrared strip lights may be used to provide infrared illumination. Examples of the diffuser include, but are not limited to, a standard volume diffuser, a single-surface diffuser, and a periodic array of low-power lenslets (with or without gaps). In some embodiments, an anti-reflective (AR) coating may be added to the bottom of the frontlight and/or to the top of the diffuser on the LCD panel for reduced contrast loss due to waveguiding and diffuse ambient reflection. These are but examples; a wide range of possibilities exist for providing infrared illumination and directing such illumination to objects on or near the outside surface of the LCD.

Figure 2:
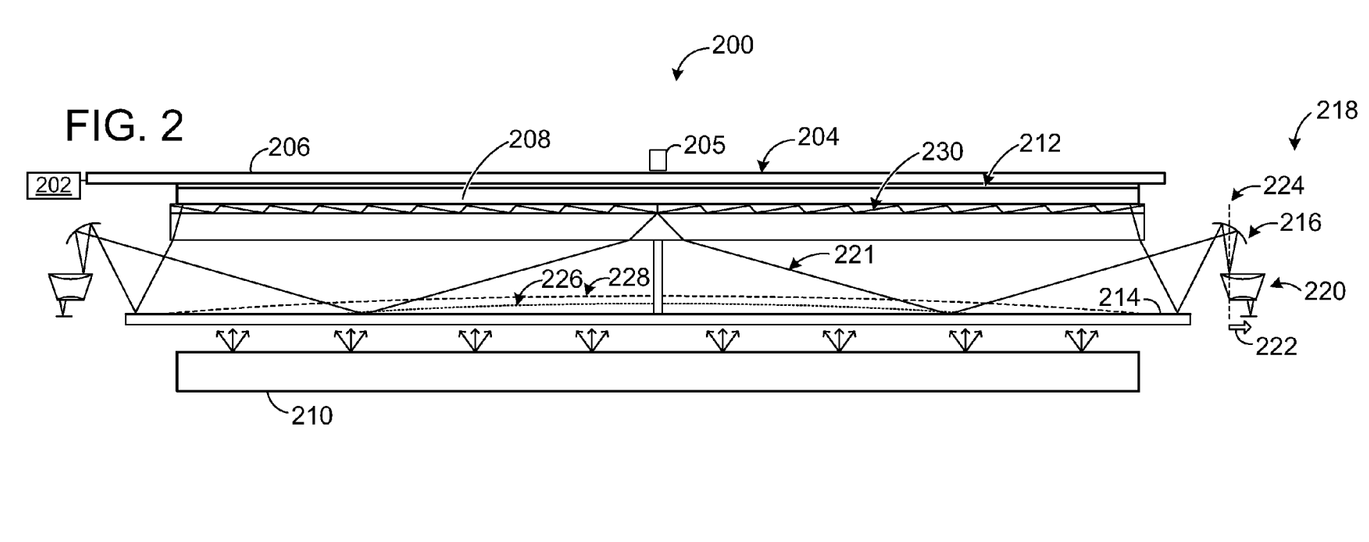
FIG. 2 schematically shows an embodiment of an example display system.

FIG. 2 schematically illustrates an embodiment of an example display system 200, wherein an infrared illumination source 202 illuminates one or more objects on and/or near the exterior surface 204, such as example object 205, via infrared lightguide 206. Depending on the type of infrared illumination system, as described above, the display may include various lightguide coupling methods which may utilize prisms, prismatic gratings, direct couplings, guided couplings, and the like. Further, display system 200 may utilize various surface structures to allow the infrared light to escape to the surface and illuminate the object, such as an aperiodic-spaced, periodic-spaced, or random-dimpled surface to disrupt the total internal reflection of the infrared light within the waveguide.

The display is provided by LCD panel 208 which is illuminated by visible light from backlight 210. As described above, a diffuser 212 may optionally be utilized for object illumination and/or backlight uniformity. Further, an AR coating may be applied to the bottom of the frontlight and/or to the top of the diffuser, to improve display contrast. Further, a touch surface of the display system may include one or more imaging sections, where each imaging section is contiguous within itself such that imaging is not compromised by localized periodic banding, described in more detail as follows. Localized banding is an effect typically seen when using a blade-type wedge, which has a double pass. The sub-banding may be caused by use of a Fresnel reflector placed at the thick end of the wedge such that only certain parity of light illuminating alternate facets makes it into the acceptance of the wedge, and thus the vision system camera. As such, bands of light may be missing in between where light illuminating alternate facets is accepted. Since display system 100 does not require such a Fresnel reflector, and thus does not suffer from a parity issue, all light imaged by display system 100 may be substantially contiguous, even when considering transmission through a Fresnel lens.

Furthermore, it can be appreciated that embodiments of display system 100 not using tiling of a Fresnel lens array may allow for a method of auto calibration, or self calibration, due to the well-defined regions of each tiled section image. As such, ease of performing stitching of the images in software may be improved.

In between backlight 210 and LCD panel 208, a reflector sheet having a wavelength-selective coating is disposed, namely dichroic mirror 214. Dichroic mirror 214 allows transmission of the backlight to the LCD panel, and then to the viewer, while reflecting the infrared light reflecting from objects on and/or near the external surface. Thus, the infrared light reflected from an object is transmitted through the LCD panel 208 in reverse, (in a direction from an external surface of the LCD panel to an internal surface of the LCD panel) toward dichroic mirror 214. The dichroic mirror 214 then reflects the received incident infrared light so as to be collected by the vision optics 216 of an infrared vision subsystem 218. As such, display system 200 provides an infrared vision subsystem 218 that efficiently coexists with LCD panel 208.

Thus, for the display, the optical path for the visible light is from backlight 210, through the dichroic mirror 214, through LCD panel 208 and toward a viewer's eye. The path for the infrared vision is from infrared illumination source 202 to an object 205. The infrared light reflected off object 205 then travels back through LCD panel 208, is then reflected off dichroic mirror 214 and travels through vision optics 216 of infrared vision subsystem 218. The infrared light is then directed onto image sensor 220, from which appropriate electronics enable acquisition of the image of the object for post-processing, as needed, via post-processing software/hardware for distortion correction, stitching, and the like. An example infrared light path is shown at 221.

The infrared vision subsystem 218 may be situated so that its components are disposed outside of all straight-line optical paths occurring between corresponding operative portions of backlight 210 and LCD panel 208, as depicted in FIG. 2. As such, infrared vision subsystem 218 is positioned so as not to disrupt illumination of LCD panel 208. Thus, the brightness of LCD panel 208 is not compromised by the incorporation of infrared vision subsystem 218 into display system 200. Various embodiments of infrared vision subsystem 218 are described in more detail hereafter.

Figure 4:
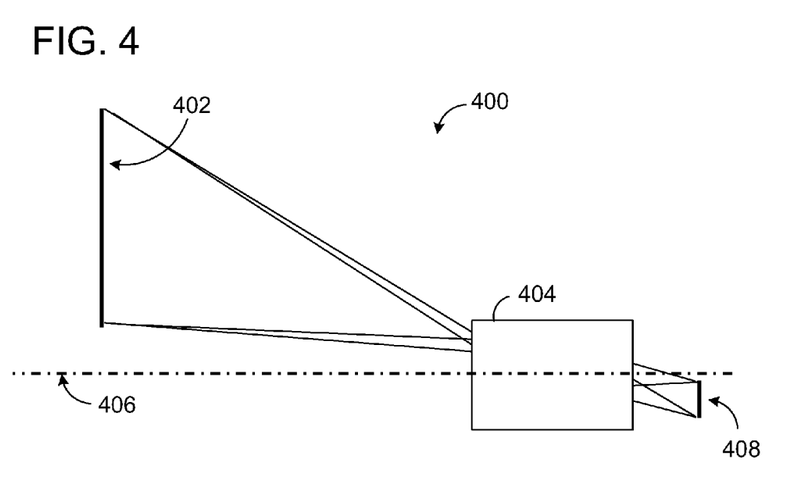
FIG. 4 schematically shows an example offset imaging system.
Figure 5:
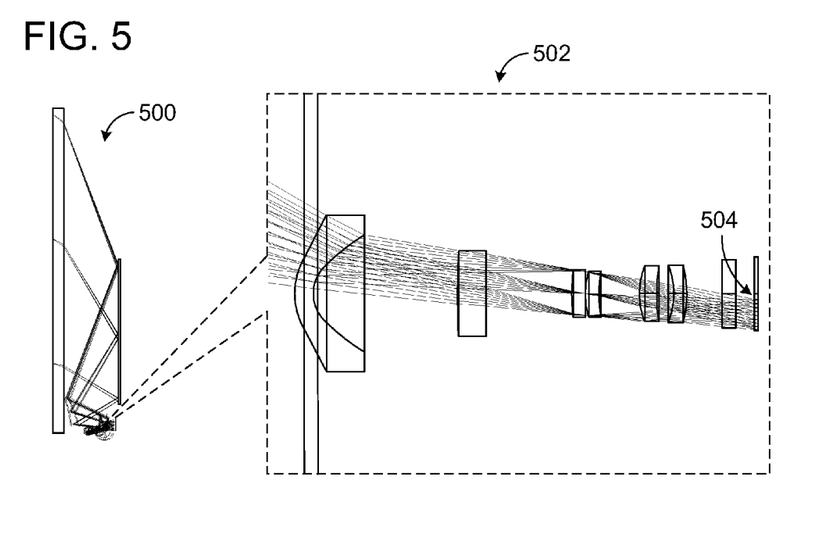
FIG. 5 schematically shows an example display device having an offset imaging system.

In some embodiments, display system 200 may utilize an infrared vision subsystem having an offset imaging system. In such a system, image sensor 220 may be "offset" in that it is positioned laterally offset from an optical axis of the infrared light incident on image sensor 220. Laterally offsetting the sensor can aid in focusing image conjugates, and in controlling distortion. An example of an offset imaging system 400 is shown in FIG. 4. In a typical imaging system, an object centered on the optical axis of the imaging system, such as the rectangular touch region, is imaged into an image conjugate of the object which exhibits size prescribed by the magnification of the system, but is still centered on the optical axis of the imaging system. When an off-axis rectangular section is the object, such as shown at 402, and is imaged through an optical system 404 (depicted as a generic "black box"), the image conjugate still exhibits size determined by the optical magnification of the system, but the image of the object is also offset with respect to the optical axis 406, as indicated at 408. Since the image conjugate planes are substantially parallel, image distortion may be minimized. As such, in an offset imaging system, image conjugates have appropriate offsets so as to maintain both image focus as well as limit distortion across the full field of view (FOV), thus maintaining mapping between the touch surface area and the sensor region. As another example, FIG. 5 shows an example display device 500 having an offset imaging system with folded optics. At 502, a magnified view of the infrared vision subsystem is shown. The offset imaging system further includes an offset image sensor 504.

An example of an offset imaging system is depicted in FIG. 2, wherein vision optics 216 direct received infrared light toward image sensor 220. As indicated by arrow 222, image sensor 220 is offset from an optical axis 224 of infrared light incident on image sensor 220. As described above, the use of offset imaging allows the vision optics to be out of the optical path of the backlight, and the wavelength-selective coating enables combination and compatibility of the visible backlight with the infrared vision. Thus, such a configuration enables the display system to have a low-cost display as well as provide high-quality, low distortion imaging in a slim form factor. Although the cost associated with lens complexity may be increased for offset imaging with respect to a simple lens case, the costs are typically moderate. Further, the use of offset imaging may reduce introduction of distortion into the system. Therefore, additional post-process interpolation may be reduced, thus reducing the potential for lost resolution incurred in such post-processing.

It can be appreciated that such an offset vision system may be used in conjunction with other two-dimensional panel display devices such as transparent organic light-emitting diode (OLED) displays. Such transparent OLEDs may have a slit opening between transistors and/or traces which can allow transparency on the order of 20%, allowing for a folded optics system to be combined with a transparent OLED or an LCD.

Figure 6:
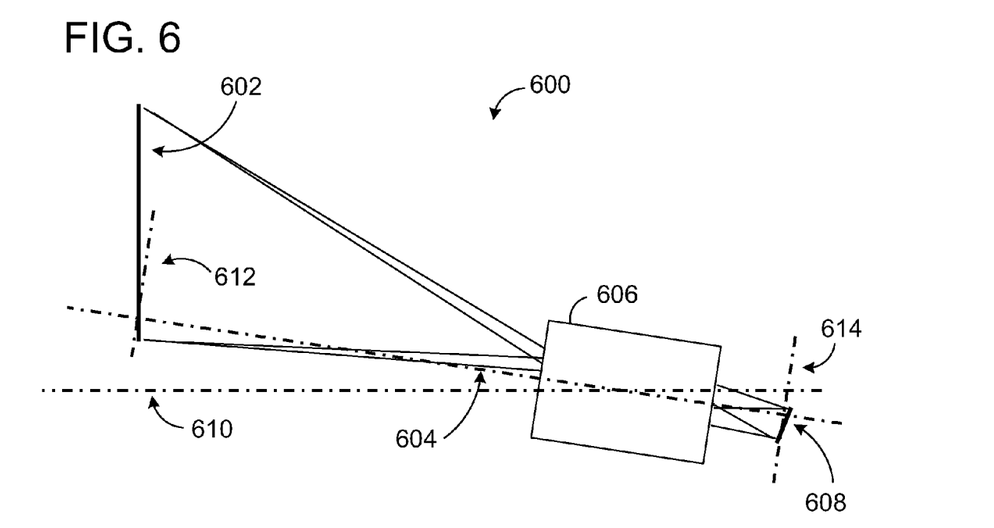
FIG. 6 schematically shows an example imaging system having both offset imaging and tilted plane imaging.

As introduced above, an alternate embodiment of the infrared vision subsystem may include a tilted plane imaging system. In such a system, a plane of the image sensor may be tilted with respect to a plane of the object. Such a system can allow for a reduction of the required field of view (FOV) as compared to the offset imaging case, however distortion may be increased. Due to such a tradeoff, it may be feasible to accept some amount of image distortion to be corrected by software in order to enable use of tilted imaging, or some limited degree of tilted imaging in conjunction with offset imaging in order to allow for further reduction in the optical sub-system cost. In some embodiments, the tilted plane imaging system may include a lens aligned to a chief axis of a field of view of a centroid of a light bundle of infrared light incident on the image sensor. Further, a tilted plane imaging system may include a combination of offset imaging and tilted plane imaging so as to allow an acceptable level of distortion while slightly reducing the optical subsystem complexity and cost. As an example, FIG. 6 shows an example imaging system 600 which combines both offset imaging and tilted plane imaging. In such a system, the object location 602 is offset from the optical axis 604 of imaging system 606 (depicted as a generic "black box"), and the image of the object is also offset with respect to optical axis 604, as indicated at 608. Imaging system 600 is tilted with respect to a normal to the surface object plane indicated at 610. As such, the object plane at 602 and the image plane at 608 are not perpendicular with respect to optical axis 604, but rather tilted as indicated at 612 and 614, respectively. As such, the object plane at 602 and image plane at 608 are tilted with respect to each other, as opposed to being parallel with one another.

For the case of a tilted plane imaging system, the infrared vision subsystem can be tiled (e.g., 1×2, 2×2, 2×3, etc.) to further reduce the already-reduced form factor resulting from folded optics. It can be appreciated that there are multiple suitable options for the imaging optics. Tilted imaging may be utilized for use scenarios having an acceptable tradeoff between distortion and simplicity of the optics. For example, in the case of tilted optics, focus across a surface can be maintained even though the lens is tilted toward the centroid of the light bundle from the area of interest, by utilizing an appropriate tilt of the image sensor plane. However, this may cause distortion in the image shape. Such distortion may be corrected in post-process by vision subsystem software/hardware. Accordingly, the tilted plane imaging system may further include a post-processor for post-processing the image acquired via the image sensor to reduce distortion of the image. Thus, a possible use scenario of a tilted plane imaging system may be one where the concern of the lens cost outweighs that associated with software/hardware for post-processing.

Figure 7:
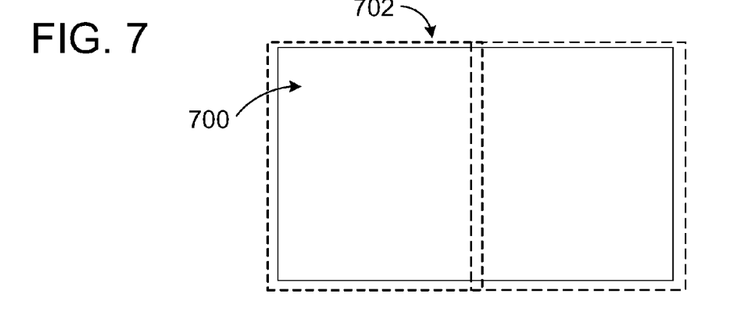
FIG. 7 schematically shows an example 1×2 layout using two distortion-corrected vision regions.
Figure 8:
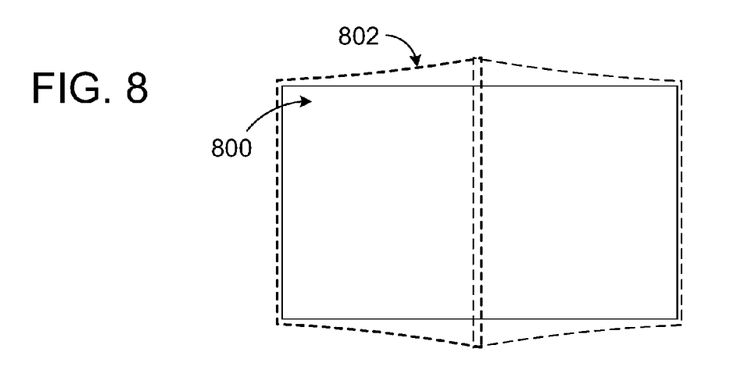
FIG. 8 schematically shows an example 1×2 layout using two focus-corrected, but distorted vision regions.

As an example, FIG. 7 shows an example 1×2 layout using two distortion-corrected vision regions, for imaging a touch region 700 via an offset imaging system. As indicated at 702, a region imaged by the vision system exhibits low distortion. As another example, FIG. 8 shows an example 1×2 layout using two focus-corrected, but distorted vision regions for imaging a touch region 800 via a tilted plane imaging system. As indicated at 802, a region imaged by the vision system exhibits distortion.

In yet another alternate embodiment of the infrared vision subsystem, a folded $2f_1/2f_2$ telecentric system having tilted image planes may be utilized. However, such a system may be difficult to fold.

In addition to the above-described features and embodiments, a display system including a backlit LCD device and wavelength-selective reflector may be provided with additional and/or different features to accommodate different use scenarios. Various examples are described in more detail hereafter.

In some cases, the mirrors of the described display system may be alternately configured. For example, the wavelength-selective mirror (e.g., dichroic mirror) may be flat, or it may be curved such as indicated at 226 and 228 in FIG. 2. For the case of a curved mirror, the mirror may be concave in profile and have as many mirror sections as imaging sections in the infrared vision system. It can be appreciated that lines 226 and 228 showing the curved case are only intended to show the body of the mirror, as only the top would be coated with the dichroic, or interference-based type, coating.

As another example, the display system may include a second, upper mirror. Such a secondary mirror is distinct from the (primary) mirror discussed above. In some embodiments the secondary mirror may be aspheric. As an example, such a secondary mirror may be provided as part of vision optics 216 shown in FIG. 2. Such a second, upper mirror may provide high FOV imaging angles while also maintaining low image distortion. As it is located out of the optical path of the backlight, there is no need for it to have wavelength sensitivity, just high reflectance for infrared light for best light efficiency. This smaller mirror can be made of metal, or for a lowest cost it can be made of molded plastic. For a lower cost with a better performance, the mirror may alternatively be made of molded glass. The mirror may have an optical coating including but not limited to a metalized coating, a dichroic coating or other optical coating having relatively high reflectance for infrared light. It should be appreciated that it is possible to design the subsystem so as to utilize a second upper mirror that is either convex or concave. However, a convex mirror may be desirable in some embodiments due to tradeoffs in system size and performance.

With regard to the infrared illumination system, infrared illumination may be provided by an infrared front light guide illuminator, or an infrared ring-light illuminator or side-light illuminator placed in close proximity to the optical axis of the subsystem such as near the second mirror and pointed toward the main mirror, or an infrared backlight such as formed by an array of infrared LEDs. In the latter case of using an infrared backlight, the response curve of the dichroic coating may be chosen to have an angular transition so as to allow high reflection of the infrared light at high AOI while at the same time allowing high transmission of the infrared light for low AOI so as to allow the light from the infrared LED array to transmit through the main mirror and illuminate the objects at touch surface. Since only light at appropriate high AOI to match the acceptance of the vision optical subsystem can pass through the vision system to sensor, a reflector dichroic coating designed to reflect high AOI and transmit low AOI may be used in such case as using an infrared LED array backlight. For the case of using illuminators placed in close proximity to the subsystem optical axis, the infrared illuminators may use telecentric correction of a prismatic or tiled Fresnel array below the panel in order to more efficiently direct infrared illumination light to the touch surface to illuminate objects. While not as efficient in the reverse direction due to the geometric footprint and optical path through the Fresnel facet, use of a Fresnel to provide telecentric imaging may further provide increased efficiency to the vision subsystem, as compared to not using a Fresnel lens for some degree of telecentric correction. Some configurations may maintain a high-AOI of infrared light exiting the lightguide infrared illuminator by applying a bias in an opposing direction to that of the vision collection to improve and/or maintain high performance, such as avoiding contrast loss due to direct illumination or back-scatter into the vision system.

Figure 3:
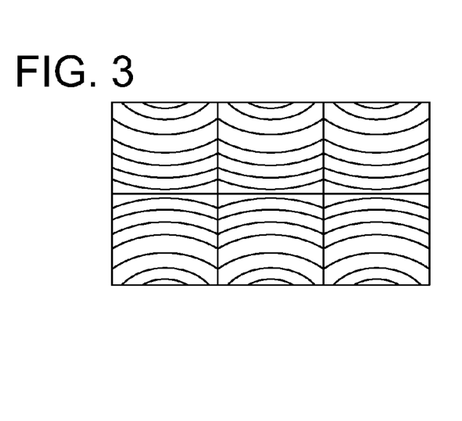
FIG. 3 schematically shows an example tiled Fresnel lens in accordance with an embodiment of the present disclosure.

Additionally or alternatively, a prismatic or tiled Fresnel array can be used to improve efficiency and uniformity into the vision optics. An example tiled Fresnel array is illustrated in FIG. 3, and an embodiment of a tiled Fresnel array 230 is included in display system 200. However, in some embodiments, a diffuser may be used near the LCD panel to help reduce or obviate the use of a prismatic or tiled Fresnel lens, while improving display backlight uniformity. Further, a wavelength-selective, angular-sensitive coating may be used on a bottom side of any lightguide infrared illuminator, which in some cases may increase efficiency and power of infrared light. Further, in some embodiments the diffuser may comprise a switchable diffuser, maintaining uniformity of display during times when the backlight unit is 'on' and not diffuse light when infrared vision is sensing the surface. In this case, it is possible to look beyond the surface to detect objects not in contact with touch surface. A third phase or state could include the diffuser in diffuse state (zero voltage applied) when sensing infrared vision so as to enable detection of touch. Thus three possible phases during a frame at video rates include: (1) a diffuse state with a display LED backlight on for display, (2) a diffuse state still with a display backlight and infrared vision capturing on for z-localization, and (3) a non-diffuse state with infrared vision capturing on for seeing beyond the surface. It can be appreciated that use of an infrared-pass filter placed before the imager/sensor can allow the system to work with two phases, namely: (1) a diffuse state with the display backlight 'on' and infrared vision capturing for touch detection, and (2) a non-diffuse state with the display backlight 'off' and infrared vision capturing for objects beyond the surface. Such use of a switchable diffuser may enable detection of gestures and provide tele-presence in the case that a telecentric Fresnel lens or Fresnel lens array is used in conjunction with the infrared vision system or array of infrared vision systems.

With regard to the wavelength-selective reflector (e.g., dichroic mirror), the wavelength-selective coating typically is configured so as to optically transmit visible light and to reflect incident infrared light. As such, the wavelength shift vs. input angle of infrared light (e.g., light having a wavelength of 866 nm) typically should demonstrate a visible transmit region that avoids overlap with an infrared reflect region. Further, the wavelength-selective coating may be configured to exhibit a shift in response vs. angle.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display system, comprising:
a liquid crystal display device;
a display backlight configured to illuminate the liquid crystal display device by directing visible light toward an interior surface of the liquid crystal display device; and
a wavelength-selective reflector disposed between the display backlight and the liquid crystal display device and having a smooth surface facing the interior surface of the liquid crystal display device, where the wavelength-selective reflector has a wavelength-selective coating configured to cause incident visible light from the display backlight to be transmitted through the wavelength-selective reflector to the liquid crystal display device, and cause incident infrared light reflected from an object on or near an exterior surface of the liquid crystal display device to be reflected off of the wavelength-selective reflector and directed to an infrared vision subsystem.

2. The display system of claim 1, wherein the infrared vision subsystem is disposed outside of all straight-line optical paths occurring between corresponding operative portions of the display backlight and the liquid crystal display device.

3. The display system of claim 2, wherein the infrared vision subsystem includes an offset imaging system having an image sensor configured to receive infrared light directed from the wavelength-selective reflector, the image sensor positioned laterally offset from an optical axis of infrared light incident on the image sensor.

4. The display system of claim 2, wherein the infrared vision subsystem includes a tilted plane imaging system having an image sensor configured to receive infrared light directed from the wavelength-selective reflector, where both a surface normal to a plane of the image sensor as well as a surface normal to a plane of the object on or near the external surface of the liquid crystal display device is tilted with respect to an imaging system optical axis.

5. The display system of claim 2, wherein the infrared vision subsystem comprises an offset imaging system and a tilted plane imaging system, the infrared vision system further comprising an image sensor configured to receive infrared light directed from the wavelength-selective reflector, the image sensor positioned laterally offset from an optical axis of infrared light incident on the image sensor and where both a surface normal to a plane of the image sensor as well as a surface normal to a plane of the object on or near the external surface of the liquid crystal display device is tilted with respect to an imaging system optical axis.

6. The display system of claim 5, wherein the tilted plane imaging system further includes a post-processor for post-processing an image acquired via the image sensor to reduce distortion of the image.

7. The display system of claim 2, further comprising a switchable diffuser enabling the infrared vision subsystem to detect one or more of physical objects and hand gestures located substantially beyond the external surface of the liquid crystal display device during a non-diffuse state of the display system.

8. The display system of claim 2, wherein a touch surface of the display system includes one or more imaging sections, each imaging section being contiguous within itself such that imaging may be substantially telecentric for one or more of at the external surface of the liquid crystal display device and above the external surface of the liquid crystal display device.

9. The display system of claim 2, wherein the infrared vision subsystem further includes an image sensor configured to receive infrared light directed from the wavelength-selective reflector and a post-processor for post-processing an image acquired via the image sensor.

10. The display system of claim 1, wherein the wavelength-selective reflector includes a dichroic mirror.

11. The display system of claim 1, further comprising an infrared illumination system configured to direct infrared light toward the object on or near the exterior surface of the liquid crystal display device.

12. A display system, comprising:
a liquid crystal display device;
a display backlight configured to illuminate the liquid crystal display device by directing visible light toward an interior surface of the liquid crystal display device;
a dichroic mirror disposed between the display backlight and the liquid crystal display device and having a smooth surface facing the interior surface of the liquid crystal display device, where the dichroic mirror has a wavelength-selective coating configured to cause incident visible light from the display backlight to be transmitted through the dichroic mirror to the liquid crystal display device, and cause incident infrared light reflected from an object on or near an exterior surface of the liquid crystal display device to be reflected off of the dichroic mirror; and
an offset infrared vision subsystem disposed outside of all straight-line optical paths occurring between corresponding operative portions of the display backlight and the liquid crystal display device, the offset infrared vision subsystem including an image sensor configured to receive infrared light directed from the dichroic mirror, the image sensor being positioned laterally offset from an optical axis of infrared light incident on the image sensor.

13. The display system of claim 12, further comprising an infrared illumination system configured to direct infrared light toward the object on or near the exterior surface of the liquid crystal display device.

14. The display system of claim 13, further comprising a diffuser disposed above the exterior surface of the liquid crystal display device and configured to aid in one or more of infrared illumination of the object and backlight uniformity.

15. A display system of a surface computing system, the display system comprising:
a liquid crystal display device;
a display backlight configured to illuminate the liquid crystal display device by directing visible light toward an interior surface of the liquid crystal display device;
an infrared illumination system configured to direct infrared light toward an object on or near an exterior surface of the liquid crystal display device;
a wavelength-selective reflector disposed between the display backlight and the liquid crystal display device and having a smooth surface facing the interior surface of the liquid crystal display device, where the wavelength-selective reflector has a wavelength-selective coating configured to cause incident visible light from the display backlight to be transmitted through the wavelength-selective reflector to the liquid crystal display device, and cause incident infrared light reflected from the object on or near the exterior surface of the liquid crystal display device to be reflected off of the wavelength-selective reflector;
a switchable diffuser disposed adjacent to the exterior surface of the liquid crystal display device and configured to aid in one or more of infrared illumination of the object and backlight uniformity; and
an infrared vision subsystem disposed outside of all straight-line optical paths occurring between corresponding operative portions of the display backlight and the liquid crystal display device, the infrared vision subsystem including an image sensor configured to receive infrared light directed from the wavelength-selective reflector.

16. The display system of claim 15, wherein the infrared vision subsystem includes an offset imaging system and the image sensor is positioned laterally offset from an optical axis of infrared light incident on the image sensor.

17. The display system of claim 15, wherein the infrared vision subsystem includes a tilted plane imaging system having a lens aligned to a chief axis of a field of view of a centroid of a light bundle of infrared light incident on the image sensor and a post-processor for post-processing an image acquired via the image sensor to reduce distortion of the image.

18. The display system of claim 15, wherein the wavelength-selective reflector includes a dichroic mirror.

19. The display system of claim 18, wherein the dichroic mirror is curved.

20. The display system of claim 15, further comprising a secondary upper mirror disposed outside of all straight-line optical paths occurring between corresponding operative portions of the display backlight and the liquid crystal display device and configured to provide high field of view imaging angles while maintaining low image distortion.

* * * * *